(12) United States Patent
Guillot et al.

(10) Patent No.: US 9,676,132 B2
(45) Date of Patent: Jun. 13, 2017

(54) PRINTER-COMPATIBLE, PRE-EMBOSSED FILMS

(71) Applicant: OMNOVA Solutions Inc., Fairlawn, OH (US)

(72) Inventors: William R. Guillot, Monroe, NC (US); Jon R. Schrader, Matthews, NC (US); Cornelius Joseph Toomey, Saint Louis, MO (US)

(73) Assignee: OMNOVA Solutions Inc., Beachwood, OH (US)

( * ) Notice: Subject to any disclaimer, the term of this patent is extended or adjusted under 35 U.S.C. 154(b) by 462 days.

(21) Appl. No.: 13/887,806

(22) Filed: May 6, 2013

(65) Prior Publication Data

US 2014/0147626 A1  May 29, 2014

Related U.S. Application Data

(62) Division of application No. 12/668,296, filed as application No. PCT/US2008/008376 on Jul. 8, 2008, now abandoned.

(Continued)

(51) Int. Cl.
*B29C 47/00* (2006.01)
*B32B 38/00* (2006.01)
(Continued)

(52) U.S. Cl.
CPC ........ *B29C 47/0061* (2013.01); *B29C 43/222* (2013.01); *B29C 47/0069* (2013.01);
(Continued)

(58) Field of Classification Search
CPC .............. B29C 43/222; B29C 47/0061; B29C 47/0069; B29C 59/04; B29D 7/01;
(Continued)

(56) References Cited

U.S. PATENT DOCUMENTS 4,076,566 A   2/1978  Power
4,396,448 A   8/1983  Ohta et al.
(Continued)

FOREIGN PATENT DOCUMENTS

JP            01172582 A  *  7/1989

OTHER PUBLICATIONS

Mahr GmbH, *Operating Instructions 3755321 Perthometer M1 and M1 CNOMO with PFM Drive Unit*, p. 1-61 and Figures 1-3, (Feb. 17, 1999).
(Continued)

*Primary Examiner* — Philip Tucker
*Assistant Examiner* — Vicki Wu
(74) *Attorney, Agent, or Firm* — Kagan Binder, PLLC; David G. Burleson

(57) ABSTRACT

Decorative films, useful for making a wide range of decorative laminates, that have a relatively deep texture on one major face and a relatively smoother, print receptive surface on the other major face. Notwithstanding the deep texture, the films have superb tracking characteristics and are compatible with a wide variety of automated printing operations. This allows automated printing equipment to print information directly onto the films.

19 Claims, 3 Drawing Sheets

Related U.S. Application Data

(60) Provisional application No. 60/959,114, filed on Jul. 11, 2007.

(51) Int. Cl.
  *B32B 3/10* (2006.01)
  *B32B 3/26* (2006.01)
  *B29C 43/22* (2006.01)
  *B29D 7/01* (2006.01)
  *B29C 59/04* (2006.01)

(52) U.S. Cl.
  CPC ............... *B29D 7/01* (2013.01); *B32B 3/10* (2013.01); *B32B 3/263* (2013.01); *B32B 38/145* (2013.01); *B29C 59/04* (2013.01); *B29K 2995/0024* (2013.01); *Y10T 428/24355* (2015.01); *Y10T 428/24479* (2015.01)

(58) Field of Classification Search
  CPC .... Y10T 428/24479; Y10T 428/24355; B29K 2995/0024; B32B 3/10; B32B 3/263; B32B 38/145
  USPC ................................................. 156/244.16
  See application file for complete search history.

(56) References Cited

U.S. PATENT DOCUMENTS

| | | | |
|---|---|---|---|
| 4,518,643 A * | 5/1985 | Francis | 428/131 |
| 4,777,073 A * | 10/1988 | Sheth | B29D 7/01 264/288.4 |
| 4,804,429 A | 2/1989 | Appleyard et al. | |
| 4,816,314 A | 3/1989 | Prawdzik et al. | |
| 5,709,918 A | 1/1998 | Kimijima et al. | |
| 5,998,005 A * | 12/1999 | Kanno | 428/221 |
| 6,017,612 A | 1/2000 | Yoshihara | |
| 6,129,800 A * | 10/2000 | Brinley | 156/209 |
| 6,180,243 B1 | 1/2001 | Johnson et al. | |
| 6,183,671 B1 | 2/2001 | Stauffacher et al. | |
| 6,210,704 B1 * | 4/2001 | Sasaki et al. | 424/443 |
| 6,436,540 B1 | 8/2002 | Garcia et al. | |
| 6,579,611 B1 | 6/2003 | Iwashita et al. | |
| 6,668,715 B1 * | 12/2003 | Biro et al. | 101/32 |
| 2001/0049007 A1 * | 12/2001 | Jones | 428/179 |
| 2002/0168503 A1 | 11/2002 | Dong et al. | |
| 2003/0116261 A1 | 6/2003 | O'Brien et al. | |
| 2004/0071978 A1 | 4/2004 | Hallenbeck et al. | |
| 2004/0186214 A1 * | 9/2004 | Li et al. | 524/474 |
| 2004/0219378 A1 | 11/2004 | Weinert et al. | |
| 2004/0224097 A1 * | 11/2004 | Lee et al. | 427/428.06 |
| 2007/0087126 A1 | 4/2007 | Jaw | |
| 2008/0058858 A1 * | 3/2008 | Smith | A61F 5/08 606/199 |
| 2009/0233046 A1 * | 9/2009 | Iulianetti | 428/137 |

OTHER PUBLICATIONS

MarSurf, "Production-Related Roughness Measuring. Mobile with Marsurf," *Marsurf Mobile Roughness Measurement Devices*, Mahr GmbH, p. 1-19.

* cited by examiner

PRINTER-COMPATIBLE, PRE-EMBOSSED FILMS

PRIORITY CLAIM

The present patent application claims priority to U.S. Provisional Patent Application having Ser. No. 60/959,114, filed on Jul. 11, 2007, by Guillot et al., and titled PRINTER-COMPATIBLE, PRE-EMBOSSED FILMS, wherein said provisional application is incorporated herein by reference in its entirety.

FIELD OF THE INVENTION

The present invention relates to laminates, particularly decorative laminates incorporating a film laminated to a substrate, wherein the film has a first, textured face and a second, relatively smooth face onto which decorative information may be applied such as by printing. More particularly, the texture applied to the first face is selected so that the film remains amenable to printing even when the texture is relatively deep.

BACKGROUND OF THE INVENTION

Decorative laminates are widely used in the cabinet, molding, furniture, consumer electronics, paneling, boating, recreational vehicles, and other industries. One conventional decorative laminate structure is formed from an at least partially transparent decorative film that is laminated to a desired substrate. The decorative film often includes decorative information such as the image(s) of wood grain, stone, leather, textile, fanciful designs, one or more colors in a pattern or otherwise, a human, an animal, nature, architecture, and the like. The film often is made from ingredients including one or more polymers. The decorative information often is on the inside face of the film while the outside face of the film bears a texture to help provide low gloss, a matted appearance, scratch and mar resistance, and/or anti-blocking resistance in printed roll, stack or other form in which a film face contacts an adjacent film face of the same or a different film. One or more additional layers may be incorporated into such a decorative laminate, either between the film and the substrate or otherwise, such as an additional decorative film, an underlay, an overlay, an adhesive, protective coating, and/or the like.

The decorative information is desirably applied onto the film using printing techniques such as ink jet printing, laser printing, gravure printing, offset printing, anastatic printing, silk screen printing, transfer printing, lithographic, flexographic, other printing methods, combinations of these, and the like. Typically, the film is textured on one major face, while the decorative information is printed onto the other major face. If the film is textured prior to printing, the film is considered to be pre-embossed. If the film is textured after printing, the film is considered to be post-embossed.

Relatively deep textures, e.g., those textures having an Ra surface roughness of over about 100 microinches, preferably over 120 microinches, and even over 150 microinches, are desirable in many applications as these tend to provide much better blocking resistance and scratch and mar resistance than lighter textures. Also, deeper textures provide very desirable visual and tactile properties.

However, there are significant challenges involved in preparing films having decorative, printed information on one face and deep texture on the other face. It is quite difficult to print decorative information onto the smoother side of a pre-embossed film bearing a deeper texture on the other side. Due to the deeper texture, such films tend to experience chatter or other tracking problems when transported through a printer. Chatter generally refers to an undesired, vibration of the moving film, especially side-to-side, repeated movement or jitter of a film. These problems can seriously compromise the quality of the printed information. Quite simply, many embodiments of conventional pre-embossed films with deep texture have not been as printer-compatible as might be desired. There is a bias in the decorative laminate industry, particularly under the relatively stringent commercial standards applicable to the decor printing industry, against trying to print onto such deeply embossed films.

The industry generally prefers to post-emboss printed films. In this technique, the film can be relatively smooth on both sides at the time of printing and have good tracking characteristics through the printer. The film is then embossed after printing.

Post-embossing involves some drawbacks, though. First, it involves an entire extra stage of manufacture that requires expensive equipment, facility space, utilities, and other resources, all of which add considerable expense to the manufacturing process. Also, post-embossing can be a bottleneck in the overall manufacturing line, adversely impacting throughput. The printed information is also put at risk, as extra handling is required for the film to traverse through the post-embossing stage of manufacturing. If the printed information is damaged or otherwise compromised during the embossing stage, scrap is produced and yields go down. Additionally, post-embossed texture is less permanent than pre-embossed texture. Under pressure and heat, which are typically used to form decorative laminates, a significant portion of post-embossed texture can be lost. Thus, a post-embossed film may have to be over-textured to meet a texture specification applicable to the laminated product. It is hard to control the uniformity of the embossing on the final product in this kind of scenario. There can be considerable variation, and specifications have to be less stringent to accommodate this.

Another technical solution is to use pre-embossed films that have a very limited degree of texture, e.g., an Ra surface roughness of under 90 microinches, even under 80 microinches, or even under 70 microinches. By limiting the texture on the "embossed" surface of a film, the pre-embossed film may exhibit acceptable tracking properties during printing. However, such light texture does not provide acceptable scratch and mar resistance and/or anti-blocking protection in many applications. Films bearing such light texture may also exhibit gloss levels that are higher than desired. Additionally, the visual and tactile sensations offered by these films may tend to be unappealing to consumers, particularly when the decorative information corresponds to natural surfaces such as wood grain, stone, leather, fabrics, and the like.

Another technical solution is to print the decorative information onto a separate film that is sufficiently smooth on both sides to be both printer compatible and ink receptive and then to incorporate this printed film into a decorative laminate that includes a separate, more deeply textured film as an overlay. This involves adding a whole extra component in the product and is accompanied by the associated extra stages of manufacture and resources to handle.

The industry could benefit significantly from a printer-compatible, pre-embossed film having a deeper texture.

SUMMARY OF THE INVENTION

The present invention provides decorative laminate films that have a relatively deep texture on one major face and a relatively smoother, print receptive surface on the other major face. The films are useful for making a wide range of decorative laminate products. Notwithstanding the deep texture, the films have superb tracking characteristics and are compatible with a wide variety of automated printing operations. This allows automated printing equipment to print information directly onto the films rather than onto separate sheets which then are laminated to a deeply textured sheet as has been practiced conventionally in the past. (Certain embodiments may incorporate separately printed layers where a combination of overlapping printed layers helps to achieve one or more kinds of desired visual effects.) The ability to print onto an already deeply textured sheet completely eliminates any need to post-emboss the film after printing, saving considerable time, expense, and facility resources.

As used herein, a deep texture is a texture having an Ra surface roughness of at least 100 micrometers, preferably over 120 micrometers, and more preferably over 150 micrometers. A procedure for determining Ra surface roughness is provided in the Detailed Description, below.

Advantageously, the film can be textured with an embossing tool (which in some modes of practice is a textured roller) having a unique texture which, in the present context, is able to perform many different functions. The texture can be relatively deep and yet the texture has a configuration such that the film nonetheless has good tracking characteristics to be printed at the resolutions demanded in the decorative laminate industry. The texture on the tool has contours that allow the texture to be formed repeatedly and consistently on moving films at high speed with exceptional uniformity along the length of a film. This extremely uniform quality is a significant quality control asset. The texture also provides excellent scratch and mar resistance and anti-blocking protection. The texture is also extremely stable under heat and pressure so that there is much less need, and even no need in some embodiments, to overtexture the films to achieve a desired degree of final texture remaining after lamination. The ability to use a more targeted degree of texture with less overtexturing further contributes to enhanced printer compatibility, inasmuch as overtexturing conventionally would be expected to contribute to tracking problems and poor or unacceptable print quality.

In one aspect, the present invention relates to a method of making a textured, decorative laminate film. A molten film is extruded. While the extruded film is at least partially molten, the film passes through a gap between first and second tooling surfaces and contacts said first and second tooling surfaces that are maintained at one or more temperatures below the melt temperature of the molten film in a manner effective to help cause the molten film to set and solidify as the film passes through the gap. The first tooling surface includes a plurality of irregular and random depressions that provide cavities that are at least partially filled by the molten film as the film passes over the first tooling surface and sets. The second tooling surface is relatively smoother than the first major surface. A solidified film is formed that includes a first, textured major face having an Ra surface roughness of greater than about 100 microinches and a second, print receptive major face having an Ra surface roughness of less than 100 microinches, wherein the ratio of the Ra surface roughness of the first major face of the film to the Ra surface roughness of the second major face of the film is in the range from about 1.1:1 to about 500:1. Decorative information is printed onto the second major face of the film.

In another aspect, the present invention relates to a decorative laminate film. The film includes a first major face having a random and irregular pattern of protuberances having different shapes and sizes, said first major surface having an Ra surface roughness of at least 100 microinches. The film also includes a second, print receptive major face, wherein the ratio of the Ra surface roughness of the first major face of the film to the Ra surface roughness of the second major face of the film is in the range from about 1.1:1 to about 500:1. The film also includes decorative information printed onto the second major face.

In another aspect, the present invention relates to a decorative laminate that includes a substrate and a decorative laminate film bonded directly or indirectly to the substrate. The decorative laminate film includes a first major face and a second, print receptive major face. The first major face includes a random and irregular pattern of protuberances having different shapes and sizes, said first major surface having an Ra surface roughness of at least 100 microinches. The ratio of the Ra surface roughness of the first major face of the film to the Ra surface roughness of the second major face of the film is in the range from about 1.1:1 to about 500:1. Decorative information is printed onto the second major face.

In another aspect, the present invention relates to a method of making a decorative laminate film that includes the steps of extruding a film having first and second major surfaces. A random, irregular, and directional texture is formed on the first major surface while the film is at least partially molten. After forming said texture on the first major surface, printing decorative information onto the second major surface of the film. Optionally, after printing, the film is laminated directly or indirectly onto a substrate.

In another aspect, the present invention relates to a method of making a decorative laminate. A decorative laminate film is prepared according to any method described herein. The film is then directly or indirectly bonded the film to a substrate.

In another aspect, the present invention relates to a method of making a decorative laminate. Any decorative laminate film as described herein is provided. This film is then directly or indirectly to a substrate.

DETAILED DESCRIPTION

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

Figure 1:
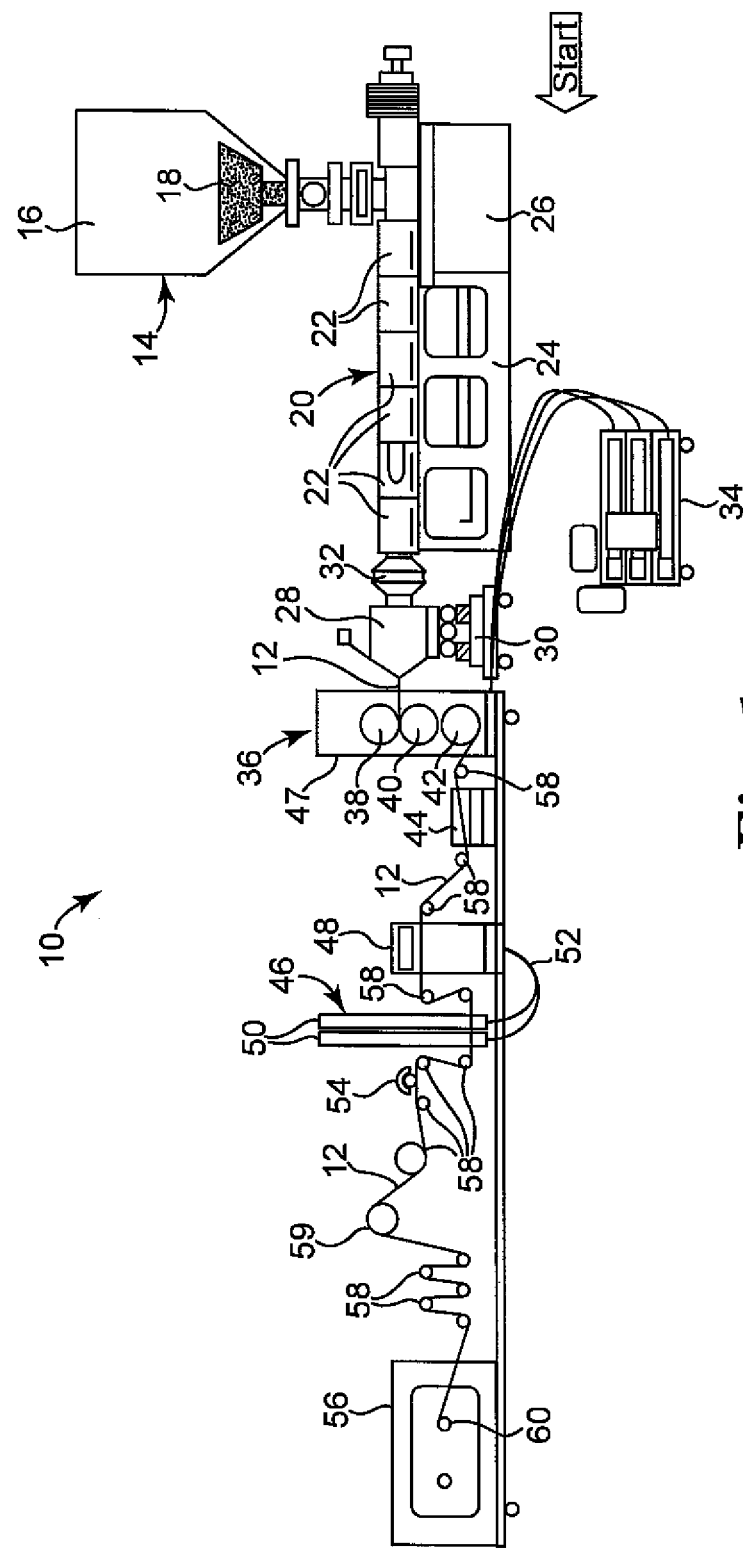
FIG. 1 schematically illustrates one system in which a printable, textured film may be prepared using extrusion techniques.
Figure 2:
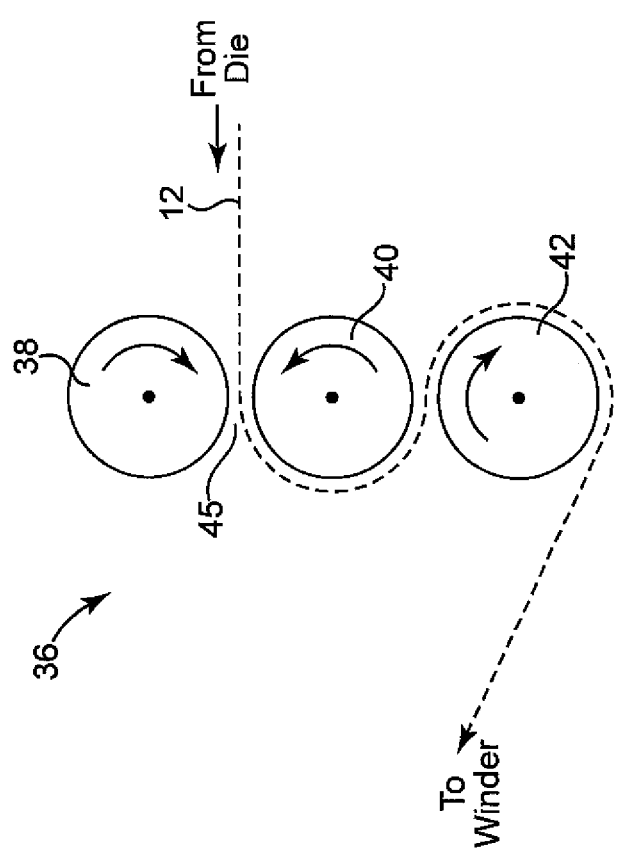
FIG. 2 schematically illustrates a portion of the system of FIG. 1, showing the path of the extruded film through a set of rollers in which one side of the film is textured and the film is set.

FIGS. 1 and 2 schematically illustrate one way in which a printable, textured film 12 may be prepared. As seen best in FIG. 1 and as an overview, system 10 includes as main components extruder 14, heat exchanger 34, texturing station 36, viewing station 44, automatic profile controller 46, slitter 54, and winder 56. The path of film 12 through system 10 from the extruder 14 to the winder 56 is shown schematically by the dotted line representing film 12. Various rollers 58 help guide and tension the film 12 during transport through the system 10. Decorative information may be printed onto the film to form decorative sheets, and these decorative sheets may then be incorporated into decorative laminate structures.

In more detail, extruder 14 includes hopper 16 into which one or more supplies of feed material(s) schematically shown as 18, are loaded into extruder 14 to form the film 12. The principles of the present invention are extremely versatile and can be beneficially used with a wide range of extrudable compositions. That the present invention is so flexible in terms of material choices provides a significant commercial advantage. In representative embodiments, the feed material includes one or more thermoplastic polymers selected from free radically polymerized polymers (such as poly(meth)acrylates, polystyrenic polymers, polyolefins, and/or others derived from ingredients comprising free radically polymerized monomers having carbon-carbon double bonds), polyester, polyurethane, polycarbonate, polyacetal, polyether, polyamide, polyimide, polyurea, combinations of these, and the like. Polyvinyl chloride (PVC) is a specific example of one suitable polymer for forming very durable decorative laminate sheets and corresponding decorative laminates of the present invention.

In some modes of practice, thermosetting polymer(s) may be used if the thermosetting reaction can be delayed until after the texture is formed in the film 12, as desired texture characteristics could be compromised if thermosetting were to proceed too far before texturizing occurs. For instance, if a polymer having radiation curable functionality (e.g., functionality curable upon exposure to a suitable energy source such as ultraviolet energy or electron beam energy) were to have a suitable melt temperature so that extrusion could occur with undue risk of triggering too much crosslinking prior to texturizing, thermosetting polymer(s) may be used as at least a portion of the feed 18 supplied to hopper 16. A suitable curing station (not shown) could then be incorporated into system 10 to cure film 12 downstream from the texturing station 36.

In addition to one or more polymers, the feed 18 introduced into hopper 16 may optionally include one or more other, optional ingredients such as one or more plasticizers, ultraviolet stabilizers, antioxidants, flatting agents; waxes; dispersants; inorganic particles; pigments; fungicides, bactericides, antistatic agents, fire retardants, combinations of these, and the like. In preferred embodiments, particularly those including PVC, the feed 18 includes less than 5 parts by weight, preferably less than 2 parts by weight, more preferably less than 0.5 parts by weight, and even less than 0.1 parts by weight of plasticizer per 100 parts by weight of the feed. It has been found that restricting, and more desirably avoiding, plasticizer provides rigid film characteristics, improved embossing retention, enhanced wear characteristics, reduced plasticizer or other component migration, enhanced flame retardance, superior film lay flat, and/or improved stain resistance. A particularly preferred feed 18 includes no plasticizer.

From hopper 16, the feed 18 is fed into the barrel (not shown) of the extruder, which is housed in barrel section 20. Housing shrouds 22 enclose the barrel to help isolate the barrel from the ambient surrounding the extruder. The barrel section 20 and hopper 16 are mounted on support structures 24 and 26.

Extruder die station 28 includes the die through which the molten feed is extruded as film 12. Extruder die station 28 is supported upon dolly 30 for mobility. The die is heated to help ensure that the exudate leaves die station 28 in a fully molten state at an appropriate temperature. Adapter 32 couples the extruder barrel to the die station 28.

In representative embodiments, film 12 extruded from the die may have a width in the range from a few inches to many tens of inches. A convenient film width suitable for commercial scale production would be in the range from about 8 inches to 120 inches. For film this wide, the thermal mass of the die is rather large. Accordingly, it is desirable if heat energy can be added at multiple locations throughout the die to facilitate temperature control. By way of example, one die configured to extrude film having a width in the range from about 60 inches to about 70 inches has seven heat input locations spaced generally equally across the face of the die. Electric heating is convenient for this purpose.

The temperature of the extruder 14 and die can depend upon factors including the nature of the feed 18. Generally, it is desirable to heat the feed 18 sufficiently so that it is fully molten when it leaves the extruder 14 as an exudate. However, the temperature should not be so high that there is an undue risk of thermally damaging the feed 18. It also is convenient to use a temperature gradient in which the temperature is ramped up to the final desired temperature. By way of illustration, when extruding a PVC polymer having a melt temperature of about 380° F. through extruder 14 having five heating zones and a heated die, the first (closest to the hopper 16) through fifth (closest to the die station 28) extruder zones may be set at 312° F., 320° F., 330° F., 340° F., and 350° F., respectively, while the die conveniently has a temperature set point of 355 F, although the die temperature may independently vary across the various die heating locations to help control the film thickness as described further below. Even though these set temperatures are below the melt temperature of the PVC polymer, the significant shear energy from the extruder screw adds enough heat energy to melt the polymer.

The molten film 12 is then processed in the texturing station 36 to set the film, forming the textured and printable surfaces. To ensure good transfer of the molten feed 18 from the die to the texturing station 36, it is desirable to place the texturing station 36 as close as is practically feasible to the die. A distance of about 2 inches to about 12 inches between the die outlet to the gap 45 (see FIG. 2) between the top roller 38 and the middle roller 40 has been found to be suitable.

The texturing station 36 generally includes a tool having a surface used for imparting the desired texture onto the film 12 and optionally one or more other components to help with film formation, transport, or the like. For purposes of illustration, station 36 includes top roller 38, middle roller 40, and bottom roller 42 mounted within a supporting structure schematically designated by the enclosure 47. The top roller 38 and middle roller 40 contribute to forming the textured and printable faces of film 12, while bottom roller 42 helps to avoid chatter and provide a smooth release as film 12 leaves texturing station 36. Line operators or other observers may view the activities within texturing station 36 from the viewing station 44, which conveniently may be in the form of a catwalk.

The middle roller 40 is textured for embossing the film 12 and includes at least one primary and at least one additional secondary texture. In one embodiment, the surface of the middle roller 40 is chrome. The at least one primary texture generally includes a plurality of depressions formed in the roller surface. When the molten film material flows over the surface of middle roller 40, the molten material fills and/or partially fills these depressions and sets. In essence then, these depressions act like female molds for forming corresponding protuberances on the adjacent (proximal) major surface of the film 12.

The depressions formed in middle roller 40 generally are irregular and random. Irregular refers to the shape and dimensions of the depressions, while random refers to the arrangement of the depressions on the roller surface. Using a population of irregular depressions randomly formed on the surface of middle roller 40 contributes to the advantages described herein, especially tracking performance, scratch and mar resistance, and blocking resistance and still maintain an acceptable print quality or graphic reproduction.

Irregular means that the depressions include a population of depressions including a plurality of shapes and a plurality of sizes. Viewed from the top, representative embodiments of the depressions can be circular in a range of sizes and/or oblong in a range of sizes and acicularity (ranging from close to circular to string-like). The acicular depressions preferably meander in a nonlinear fashion and/or may include one or more branches. Branches may extend outward from one portion of a depression and rejoin the depression at another portion. The depressions preferably have rounded contours to facilitate smooth, easy release of the set film 12 from middle roller 40, although the bottoms of the depressions may be flat for machining convenience.

The depressions will also vary in terms of their lengths, widths, and depths both among features and optionally intrafeature as well. The dimensions of these depression features can vary over a wide range depending upon factors including the film thickness, the desired end use, the nature of the printing equipment to be used, and the like. Generally, if the depressions are too small, the resulting texture on film 12 may be too fine to provide the desired scratch and mar resistance and/or blocking resistance. A texture that is too fine may impair visual and texture effects desired in the resultant decorative laminate product. On the other hand, if the texture is too much, more texture telegraphing from one side of the film to the other than is desired may occur, mechanical properties of the film may be reduced too much, tracking through printing devices may suffer, and/or unacceptable print quality may be incurred.

Figure 3:
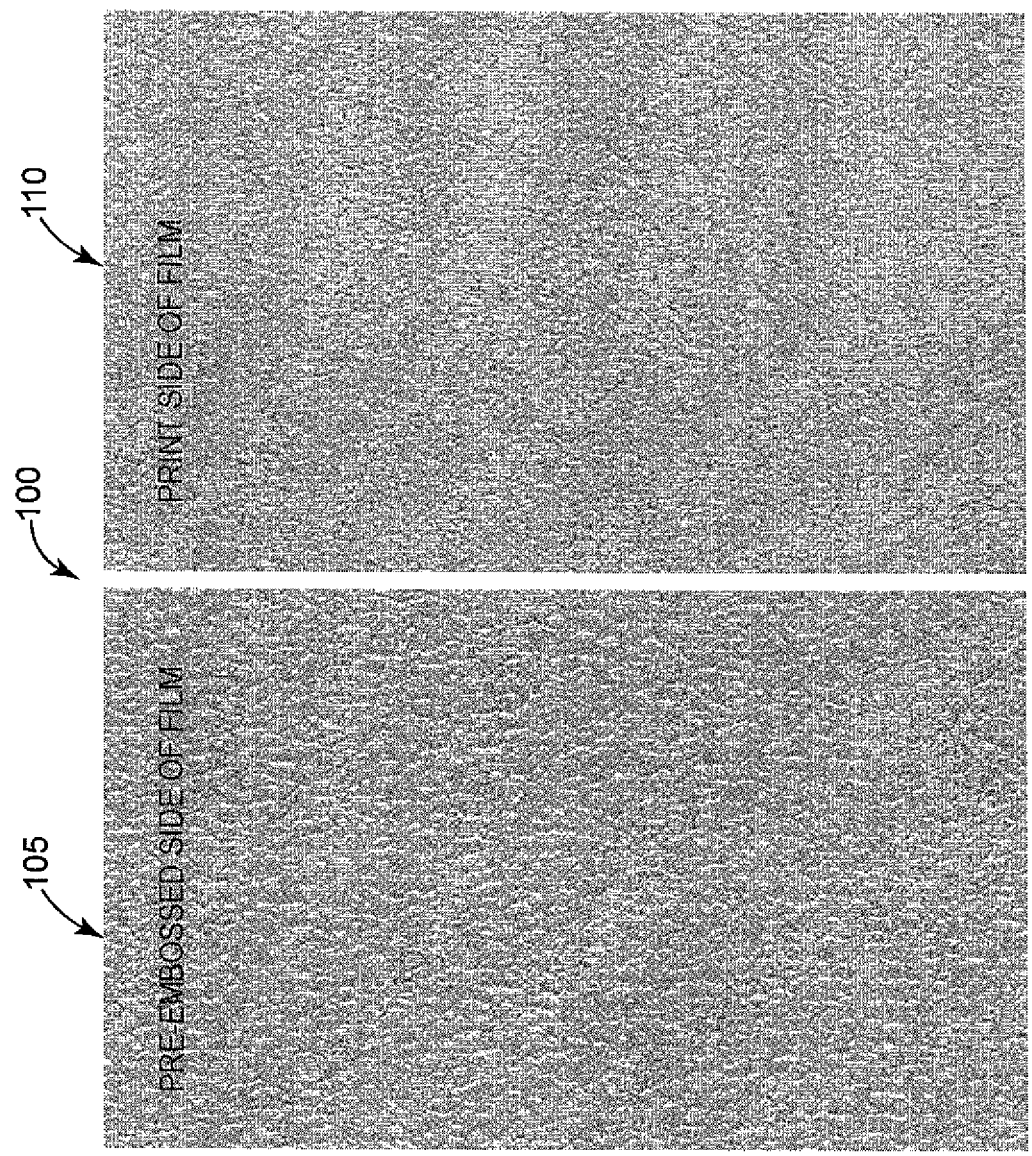
FIG. 3 is a copy of a pair of photographs showing the texture on the pre-embossed side of the film and the print side of the film, respectively, taken at a magnification of 700%.

Balancing such concerns, one representative but nonlimiting set of roller depressions may have dimensions effective to provide an embossed film surface having an Ra surface texture as specified herein. This may correspond to depressions having a range of depths up to about 5 thousandths to 6 thousandths of an inch, which in turn may be plated with a surface covering, e.g., chrome having a thickness of 2 mils or less, even 1 mil or less. Suitable widths and lengths of the depressions may vary over a very wide range, particularly given that preferred roller textures include a population of depressions having string-like contours of varying lengths and widths. FIG. 3 and the corresponding discussion below shows preferred embodiments of representative film textures that would result from correspondingly textured middle roller 40. For instance, the protuberances formed on the pre-embossed side 105 of the film 100 shown in FIG. 3 would be formed by a roller having corresponding depressions in its surface that contacted and embossed the film 100.

Random means that the depressions formed on the roller surface are not arranged in regular columns or rows. So long as the features are staggered so as not to be arranged in regular columns or rows, the texture can be directional, e.g., uni-directional, bi-directional, multi-directional, or the like. For instance, the textures shown in FIG. 3 are directional and yet staggered so as to be random. On the corresponding roller used to form such protuberances in the film 12, the roller depressions would be directionally oriented generally circumferentially around the roller surface, generally perpendicular to the roller axis, so that the resultant protuberances formed on film 12 are generally directionally aligned with the direction of the moving film 12 as the film 12 moves over the roller surface.

The density of the depression features on the surface of middle roller 40 may vary over a wide range. For instance, depressions may be formed so that individual depressions generally are isolated from other depressions by intervening land areas, analogous to the dimpled surface of a golf ball. Alternatively, depressions may be formed so that the population of depressions may include two or more depressions that overlap at least partially in a depression cluster with an intervening land area between this cluster and another cluster and/or depression. In still other embodiments, depressions may be formed in such a density such that substantially the entire surface of the middle roller 40 is covered by overlapping depressions with very little unsurfaced land area remaining. The texture desirably covers at least 50% of the roller surface, preferably at least 80% of the surface, more preferably at least 98% or more of the surface.

The texture on middle roller 40 can be formed in a variety of ways, including via acid-etching, electromechanical milling, laser engraving, die milling, peening, and/or other suitable methods. In one circumstance, such as when a tool according to a die mill method is used to form the texture on middle roller 40, the tool may have to be repeatedly run back and forth over the surface in order to complete the texture. In this sense, each pass could be said to repeat the pattern on the tool. Yet, if the pattern on the tool is irregular or random and/or if the tool is run over the roller in different directions and/or configurations, or in a spiraling or other nonparallel path, the texture on the roller will be deemed to be random and irregular in the practice of the present invention.

Advantageously, the primary texture used on middle roller 40 simultaneously serves multiple functions in the context of the present invention. First, the texture on middle roller 40 allows a corresponding, relatively deep texture to be formed on the proximal major face of film 12 with minimal telegraphing of this texture onto the other, print receptive major face of film 12 even when film 12 is moving over middle roller 40 at relatively high line speeds suitable for commercial scale production. In short, the roller texture is an important factor that allows one major face of the film 12 to be textured while the other major face of film 12 remains relatively smooth and printable. Without wishing to be bound by theory, it is believed that the use of depressions to form a substantial portion of the primary texture features of middle roller 40 allow this. These depressions allow the molten material used to form film 12 to flow smoothly over and fill the depressions as the molten material sets. The other major face of the film is far less affected by this smooth filling action than might be expected. In contrast, if the roller surface were to include an undue amount of protuberances, these could cause enough turbulence or other flow disruption such that substantial telegraphing of texture to the other major surface of the film could occur. If this were to happen, print receptive qualities of the other major surface could be compromised.

Additionally, the texture characteristics of middle roller 40 yield deeply textured films 12 that nonetheless track consistently well through printing devices at line speeds suitable for commercial scale production. This is counter to conventional wisdom in the industry, where deeply textured films experience tracking and chatter problems during attempted printing operations. Without wishing to be bound by theory, it is believed that the resultant texture formed on film 12, which is essentially randomly and uniformly distributed over one major surface of film 12 allows very effective and uniform air bleed characteristics under the film 12 as it traverses through a printer. As a consequence, localized pressure changes under the film 12 having a magnitude sufficient to induce tracking issues are substantially avoided.

Pre-embossed texture also avoids exposing print quality and design clarity on the printed sheets to post-emboss damage risk. Post-embossing, even when intended to be mainly applied to one major face of a film can nonetheless result in telegraphing of the embossed texture to the opposite, printed face. Print quality can be lost to some degree if this were to happen in post-embossing processes. Thus, print quality and design clarity of as printed decorative information tend to be retained to a higher degree on pre-embossed films than on post-embossed films.

Further, the molten material is able to smoothly, consistently, and substantially fully and/or partially fill the depressions on the roller before the film 12 sets. This means that the resultant texture is very consistent along the full length of a roll and from roll-to-roll, day after day. This is an important advantage in commercial scale production that greatly eases quality control activities. This extreme consistency is much more difficult to achieve on a roller that includes relatively greater proportions of protuberances versus depressions, particularly when the protuberances are closely spaced sufficiently to unduly disrupt flow over the roller surface. Thus, although middle roller 40 may include some amount of protuberances in addition to depressions, it is desirable to minimize these protuberances so that they constitute less than 20%, more preferably less than 10%, and more preferably less than 2% of the surface area of middle roller 40.

Another advantage is that the resultant texture formed on the decorative sheet provides the sheet and a laminate incorporating the sheet with superb scratch and mar resistance and anti-blocking protection. In practical effect, the texture as formed on the embossed surface of the film includes a plurality of protuberances projected generally upward from the film surface. For anti-blocking protection, these act like stand-offs, reducing the contact area with an adjacent film face when stacked, wound on a roll, etc.

Another advantage is that embossing the extruded film 12 at the time the film is first set after emerging from the extruder 14, i.e., pre-embossing the film, completely eliminates any need to post-emboss the film 12 which typically has occurred after printing. Since an extruded film desirably is run between a pair of rollers to set it at a uniform thickness, allowing one of these setting rollers to be the textured middle roller 40 eliminates the entire post-embossing manufacturing stage, leading to substantial cost savings in manufacture. This also helps to protect the information printed on the film 12, which is at risk of being damaged if the film bearing the printing must be run through post-emboss equipment. Yield losses due to emboss process issues or to printing damage occurring during a post-emboss are entirely avoided. Since the post-emboss stage can sometimes be a bottleneck in the manufacture process, eliminating the post-emboss also dramatically increases throughput. Further, the facility floor space previously taken up by post-emboss equipment can now be used by other productive stages, increasing throughput even more.

Still another advantage is that the pre-embossed texture of the present invention is much more stable under heat and pressure than a post-emboss texture. For instance, when a post-embossed sheet is laminated onto a substrate under heat and pressure, a significant portion of the texture is lost, e.g., 30% or even more. This has provided a motivation to over-texture post-embossed films to ensure that the laminated product still bears enough texture after the lamination stage. Since over-texturing makes printing more difficult, if not impractical, printing typically occurred prior to post-embossing. In contrast, a pre-embossed film laminated under otherwise identical conditions loses substantially less texture, e.g., 11% or even less. Indeed, in PVC film embodiments incorporating no plasticizer, the surface roughness of the films following lamination was the same as the decorative sheet prior to lamination within the measurement capabilities of the measurement instrument. In other words, within the measurement capabilities of the instrument, no loss of texture after lamination could be identified.

Thus, pre-embossed sheets of the present invention can be fabricated with a texture that is much closer to the final, desired texture goal. Alternatively stated, there is much less need to resort to significant overtexturing protection when practicing the present invention. This more targeted texture in combination with the right kind of texture is an important combination that allows the film 12 to be printer compatible, as much as overtexturing would tend to be associated with a significant risk of printer incompatibility.

It is also believed that many advantages would be realized in the course of laminating these films onto substrates. Because of the stability of the texture under heat pressure, lamination would be able to occur under a wider range of manufacturing conditions. For instance, greater heat and/or pressure may be used in order to laminate faster, leading to higher throughput. Due to the excellent scratch and mar resistance and blocking resistance, the films would be more compatible with a wider range of equipment. It is also believed that the degree, nature, and permanence of the texture will allow the visual impact of gel spots (which are believed to result from higher molecular weight lumps of resin in the extruded film) to be hidden to a greater degree and, thus, lessened.

In addition to the primary texture described above, the middle roller 40 may also incorporate one or more additional kinds of textures. For instance, it may be desirable to further incorporate a gloss modifying, secondary texture onto at least the film surface bearing the primary texture. According to one convenient approach, this texture is obtained through appropriate surface roughening of a plating, e.g., chrome plating, covering the primary texture. The degree of roughness can be controlled by the grit finish used to surface the plating. This additional gloss modifying texture is at a much smaller scale than the texture provided by the depressions of the middle roller 40. By way of analogy, if the roller land surface(s) and depressions are viewed as plateaus and valleys respectively, the secondary texture may be viewed as shrubbery growing on the surfaces of those plateaus and valleys. Thus, returning from the analogy to the context of the present invention, the finer texture is provided on both the land(s) and the depressions. The amount of this kind of texture used can vary over a wide range and depends, to a large degree, upon what kind of gloss characteristics are desired for the final product.

In embodiments of the invention in which film 12 is transparent, imparting this texture onto one major face of the film impacts the gloss on the other major face even when that other major face was not physically modified. For instance, film embodiments of the invention had glosses on their embossed sides of about 51 on average and about 23 on average on the print side after moderate roughening of the embossed side to provide a secondary texture. Additional but otherwise identical film samples were roughened only on the embossed side with a greater degree of secondary texture to provide average gloss readings on the embossed side of about 25. The gloss on the unmodified print side of these samples averaged about 19. Note that all gloss readings herein were taken with the gloss meter (Byk Gardner micro-gloss 60°) parallel to the web direction and are reported as an average of five readings for each sample tested.

Top roller 38 rides on top of film 12 under a suitable pressure as film 12 passes between middle roller 40 and top roller 38. In one embodiment, a top roller pressure of about 700 psi was found to be suitable. The surface of top roller 38 is desirably as smooth as is practically feasible to help ensure that the top surface of film 12 in contact with top roller 38 is correspondingly smooth for promoting print receptive characteristics. Optionally, the top roller 38 also has a resilient, rubber surface so that the risk of roller damage is minimized if the top roller 38 and the middle roller 40 were to come into contact. A resilient rubber with a Durometer A hardness in the range of 60 to 80 at 25° C. would be suitable. In one embodiment, top roller 38 has a rubber sleeve on a steel core. A rubber sleeve made from a silicon rubber have a 70 Durometer A hardness would be suitable.

The bottom roller 42 is positioned at the bottom of the 3-roll stack. The bottom roller 42 helps to avoid chatter and promotes a smooth release of film 12 from the texturing station 36. In one illustrative embodiment, the bottom roller 42 has a smooth, chrome surface.

The path of film 12 through texturing station 36 is seen best in FIG. 2. The molten, extruded, molten film 12 extruded from the extruder 14 is introduced to the texturing station 36 by feeding the molten film 12 into the gap 45 between top roller 38 and middle roller 40. The top roller 38 applies pressure against the film 12, helping to hold it against middle roller 40. The smooth surface of top roller 38 also helps to form a smooth, print receptive surface on the major face of the film 12 adjacent to top roller 38. In the meantime, the middle roller 40 contacts and texturizes the other major face of the film 12.

The three rollers 38, 40, and 42 are held at a temperature sufficiently below the melt temperature of the film material so that the film 12 sets when the film material contacts these rollers. In one mode of practice for processing a PVC film feed having a melt (exudate) temperature of about 380° F., the molten film 12 entering the texturing station 36 is at a temperature of about 350° F., the top roller is at 75° F., the middle roller is at 185° F., and the bottom roller is at 175° F. The top roller 38 is cooler than the middle roller 40 so that the top surface sets a little faster, which helps to promote formation of a smoother, print receptive surface on the face of the film 12 adjacent to the top roller. The middle roller 40 is warmer so that the film material sets a little slower on the adjacent face, which helps the film material to conform to the texture of the middle roller 40 better than if the middle roller 40 were to be too cool. Heat exchanger 34 is coupled to texturing station 36 in order to help control the temperatures of the rollers 38, 40, and 42.

The speed of the film 12 through the texturing station 36 can vary over a wide range, such as from about 1 foot per minute up to about 1000 feet per minute or even more. Advantageously, a significant, printer-compatible texture can be formed on film 12 at high processing speeds suitable for commercial scale manufacture. In one mode of practice, for example, roller speeds corresponding to a film speed of about 190 feet per minute at a tension setting of about 48 psi to about 50 psi would be suitable.

The texture of the resultant film 12 may be characterized in terms of the Ra surface roughness of both the embossed and print sides of the film 12. In the practice of the present invention, Ra surface roughness is the arithmetic mean deviation of the roughness profile, recorded within the evaluation length. Simply put, Ra is the average of a set of individual measurements of a surfaces peaks and valleys and is reported in units of length, e.g., microinches (micrometers).

To measure the Ra surface roughness of the embossed side of the film, the film is placed print side down onto a piece of unscratched, unmarred glass. A perthometer instrument is placed on the film parallel to web path. The device is activated and measurements are taken. The procedure for measuring Ra surface roughness uses a Model M1 Mahr Perthometer instrument commercially available from Willrich Precision Instruments Co., Inc. according to the procedure provided in the instrument's instruction manual titled "Operating Instructions 3755321; Perthometer M1 with PFM Drive Unit", wherein the entirety of this instruction manual is incorporated herein by reference in its entirety. The unit is used in ISO mode. The automatic function is not used. The maximum trace interval of 0.7 inches is used. Five sampling lengths (cut offs) of 0.1 inches are used, although seven such lengths are measured. The leading and trailing measurements are discarded and the central five retained to help eliminate startup and stand-down noise. The NHT 6-100 stylus is used. The NHT 6-100 pick up is a single-skid pick-up whose skid has a spherical shape with a radius in the tracing direction of 25 mm and a radius at right angles to this of 2.9 mm and a contact point 0.8 mm in front of the stylus. The stylus tip has a radius of 2 micrometers and a cone angle of 90 degrees per DIN EN ISO 3274. The measuring force is approximately 0.7 mN. The tracing speed is 0.5 mm/s. The recorded profile is filtered with a phase-corrected profile filter (Gaussian filter) in accordance with DIN EN ISO 11562. Additional parameter settings for using the perthometer are as follows:

Language: English
Units: Inches
Timeout: On
Blocking: Off
V.24 38400 N 8120
Battery: 100%
Pick up type: 100
Corr. Value: 3%
N 5
PFM On
Lc Standard 320 ui
Autoprinting Off
Profile On After taking the first measurement, the probe, or pick up, is moved a few inches away four more times with four more measurements taken at each move. The readings are averaged, and the average is taken as the Ra surface roughness for that side of the film. To measure the Ra surface roughness of the printable side of the film, the film is turned and placed on the same place on the glass. Measurements are done in the exact same way with readings averaged and recorded.

Desirably, the embossed side of the film has a deep surface texture, yet not so deep that the film is incompatible with desired printing operations. Thus, if the texture of the embossed side is too deep, the film could experience chatter, poor print quality or other tracking issues during printing. For this reason, the Ra surface roughness of the embossed side of preferred film embodiments is desirably at least 100 microinches, preferably at least 120 microinches, and more preferably at least 150 microinches. Desirably, the Ra surface roughness is no more than 300 microinches, preferably no more than about 250 microinches; and the ratio of the Ra surface roughness of the embossed side to the printed side is in the range from about 1.2:1 to 500:1, preferably about 3:2 to about 10:1; more preferably about 3:2 to about 3:1. In illustrative embodiments of the invention, the embossed side of very preferred embodiments of PVC films of the present invention had Ra surface roughness measurements in the range from about 160 to about 190 microinches (averaging 168 microinches), while the printed sides of these films had Ra surface roughness values in the range from about 60 to about 90 microinches, averaging 74 to 79 microinches. Consequently, in a particularly preferred embodiment, the Ra surface roughness of the embossed side is in the range of from about 160 microinches to about 190 microinches, and the Ra surface roughness of the printed side is less than about 90 microinches, preferably less than 75 microinches, more preferably less than 60 microinches, and in some desirable embodiments is in the range of from about 60 microinches to about 90 microinches.

FIG. 3 is a copy of a pair of photographs showing the texture on the pre-embossed side 105 of the film and the print side 110 of the film 100, respectively, taken at a magnification of 700%. The relatively deep texture on the pre-embossed face 105 of the film 100 can be seen as a relatively random yet directional texture of protuberances projecting upward from the main face of this side of the film 100. The texture is random in the sense that the features lack uniformity in two or more of length, degree of meandering (deviation from linearity), height, and width, and general orientation. The texture is directional in that a substantial portion of the protuberances generally have long axes that generally run from the top to the bottom of the photograph, even though the axes of features from top to bottom are not arranged in columns but instead are irregularly staggered. Some of the features are branched, with multiple arms. The photograph of the print side 110 of the film 100 shows a similar texture, but on a smaller scale.

Referring again to FIGS. 1 and 2 collectively, but mainly FIG. 1, the next major station that the film passes through is the automatic profile controller station 46 which includes the profile controller 48, power source 50, and electrical wiring 52 coupling power source 52 controller 48. According to a feedback control loop, the controller 48 measures the thickness of the film 12 passing through controller 48. If the thickness is outside of specifications, the controller 48 sends a signal to the die heating source(s) causing the temperature at the die to increase or go down. Generally, increasing the temperature at the die thins the film 12, while lowering the temperature thickens the film 12. After the automatic profile controller station 46, the edges of the film 12 are trimmed at slitter 54. A pull roller 59 is positioned after slitter 54. Pull roller 59 is a driven roller that helps to pull the film 12 through the system 10. After slitting, the film 12 may then be transported directly to a printing station (not shown), wound up and stored until needed, or otherwise handled. For purposes of illustration, FIG. 1 shows that film 12 is wound and stored for further use on a take up roll 60 in winder 56.

The thickness of film 12 can be selected within a considerably wide range. If too thin, however, the film 12 may have poor mechanical and durability properties. Films that are too thick waste material and may be more difficult to run through printing equipment, but thicker films certainly could be used where excess material usage is not a concern and printing equipment is capable of handling the additional thickness. Generally, it is convenient to prepare embodiments of film 12 that have thicknesses in the range from about 1.0 mil or less to about 20 mils, preferably about 1.5 mils to about 2.5 mils.

Decorative information may be printed onto the film 12 to form decorative laminate films, and these printed films may then be incorporated into decorative laminate structures using any suitable techniques. Any kind of printed information may be printed directly onto the print receptive side of film 12. The printed image may be, but is not limited to an image of a wood grain, stone, marble, leather, fabric or other textile, porcelain, a metallic surface, a pattern, one or more colors, a graphic image, combinations of these, and the like. Photographic images of people, animals, nature, places, things, and/or the like also may be used. The decorative image may be a solid color without a defined image. A variety of printing methods may be used to apply printed information onto the film 12, including by way of example ink jet printing, laser printing, gravure printing, offset printing, anastatic printing, silk screen printing, transfer printing, combinations of these, and the like.

To accommodate the deep texture of film 12, it may be desirable to adjust print process parameters to obtain decorative film sheets whose printing satisfies desired quality and clarity standards. For instance, in the case of roto gravure printing, because of the rougher texture of the embossed side and of the moderate texture of even the printed side of films in some embodiments, conventional settings useful may lead to images that are too grainy and/or have dot skipping or print omits. Consequently, use of films 12 may require adjustments to parameters relating to ink viscosity, nip pressure, line screen density on the design roll, and/or blade angles. Inks with moderately lower viscosity are desired in order to help insure that the thinner inks can adequately flow and cover the moderately textured printable film surface. In representative embodiments, suitable inks have a No. 2 Zahn viscosity at ambient of about 18 seconds to 20 seconds.

Nip pressure is desirably increased moderately to help facilitate good ink penetration into the surface topography. Whereas conventional nip pressures might be moderately below 40 psi, it is more desirable to use nip pressures above 40 psi. In one mode of practice, a nip pressure of 45 psi is suitable.

The line screen density of the design roller can vary over a wide range. Often, a line screen density on the order of 150 lines per inch or higher might be desired in a conventional printing operation. However, when printing onto a film surface with a moderate texture, using a line screen density on the order of 150 lines per inch or less, desirably even 120 lines per inch, helps to pick up a greater volume of ink from the ink bath and leads to better coverage over the surface to be printed.

The doctor blade angle is desirably reduced, too, in order to spread ink better in the current context. Blade angles ranging from 5 degrees to 25 degrees with verticals ranging from 2⅝ inches to 4¼ inches have been suitable. For instance, when printing a three color pattern corresponding to a wood grain texture, a blade angle of 25 degrees with 2⅝ vertical is used to print a woodgrain tick; a blade angle of 15 degrees and 2¾ vertical was used to print the woodgrain key, and a blade angle of 5 degrees with a 4¼ inch vertical was used to print the solid base color. Web tension of 8 to 15 psi would be suitable.

The resultant decorative sheet can be readily incorporated into a wide variety of decorative laminates. Examples from among many suitable applications include flooring, worktops, wall coverings, desktops, furniture, electrical and appliance housings, cabinets and cabinet doors (kitchen, bathroom, bedroom, family room, living room, dining room, etc.), and the like.

In an exemplary decorative laminate construction, a decorative sheet is adhered to one or more substrates to form the desired end product or a component thereof. Any desired substrate may be used. The substrate can be synthetic or natural. Examples include reinforced or unreinforced polymers, particleboard, medium density fiberboard, plywood, wood, paper, cardboard, metal, oriented strand board, wheatboard, strawboard, reconstituted cellulosic panels, polymeric foams, honeycomb structural panels, mineral filled polymer, concrete or other ceramic, or an unreinforced or reinforced polymeric layer, combinations of these and the like.

In addition to the decorative sheet and the substrate, decorative laminates of the present invention may include one or more additional layers if desired. Examples include one or more additional decorative sheets in layers to create composite visual effects, overlays, underlays, adhesive layers as needed for laminating, and the like. Examples of such additional layers have been described in U.S. Patent Publication No. 2002/0168503, incorporated herein by reference in its entirety for all purposes.

The laminates of the invention can be formed by any desired process. Typically, decorative laminates are formed by using adhesives and elevated temperatures and pressures to bond layers of the laminate together. Continuous laminating methods are preferred for commercial scale production. Suitable manufacturing lines should be capable of rapid throughput with controlled temperature and pressure during laminating steps. Optionally, one or more layers of the product may be formed via coating a fluid composition, which may be a liquid, dispersion, or the like, which is then cured to form a solid or gel component, as desired. Adhesives may be used to assist with bonding where needed. Hot melt, ultraviolet hardening, or heat hardening adhesives are just a few examples of the many adhesives available in the industry.

Decorative laminates, layers and features useful in decorative laminates, methods of making these layers and features, and methods of forming the laminates are described in U.S. Pat. Nos. 6,436,540; 4,816,314; 6,017,612; 4,076,566; 6,579,611; and 4,396,448; and in U.S. Pat. Pub. Nos. 2003/0116261; 2007/0087126; 2002/0168503; each of which is incorporated herein by reference in its respective entirety for all purposes.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making a textured, decorative film, comprising the steps of:
    a) extruding a molten film, wherein the film comprises polyvinyl chloride;
    b) while the extruded film is at least partially molten, causing the film to pass through a gap between and contact first and second tooling surfaces that are maintained at one or more temperatures below the melt temperature of the molten film in a manner effective to help cause the molten film to set and solidify as the film passes through the gap, said first tooling surface comprising a plurality of depressions on the first tooling surface that provide cavities that are at least partially filled by the molten film as the film passes over the first tooling surface and sets, wherein said plurality of depressions have a plurality of different shapes and a plurality of different dimensions, wherein said plurality of different shapes comprise at least circular shaped depressions, and wherein said plurality of depressions are randomly arranged on the first tooling surface, and wherein said second tooling surface being relatively smoother than the first tooling surface, whereby a solidified film is formed comprising a first, textured major face having an Ra surface roughness of greater than about 100 microinches and a second, print receptive major face having an Ra surface roughness of less than 100 microinches, wherein the ratio of the Ra surface roughness of the first major face of the film to the Ra surface roughness of the second major face of the film is in the range from about 1.1:1 to about 500:1; and
    c) printing decorative information onto the second major face of the film.

2. The method of claim 1, wherein the film comprises less than 2 parts by weight of total plasticizer per 100 parts by weight of the film.

3. The method of claim 1, wherein the film comprises less than 0.1 parts by weight of total plasticizer per 100 parts by weight of the film.

4. The method of claim 1, wherein at least a portion of the depressions comprises generally flat bottoms.

5. The method of claim 1, wherein the second tooling surface is biased toward the first tooling surface under pressure.

6. The method of claim 1, wherein said plurality of different shapes further comprise oblong shaped depressions.

7. The method of claim 1, wherein the plurality of depressions cover at least 50% of the first tooling surface.

8. The method of claim 1, wherein the first tool surface includes a secondary texture formed at least on the depressions.

9. The method of claim 1, wherein the depressions are formed over at least 98% of the first tooling surface that contacts the film.

10. The method of claim 1, wherein the first, textured major face has an Ra surface roughness of at least 120 microinches.

11. The method of claim 1, wherein the first, textured major face has an Ra surface roughness of at least 150 microinches.

12. The method of claim 1, wherein the first major face has an Ra surface roughness of 160 to 190 microinches.

13. The method of claim 1, wherein the first, textured major face has an Ra surface roughness of 120 to 300 microinches.

14. The method of claim 1, wherein the second, print receptive major face has an Ra surface roughness in the range from 60 microinches to 90 microinches.

15. The method of claim 1, wherein the second, print receptive major face has an Ra surface roughness of less than 60 microinches.

16. The method of claim 1, wherein the ratio of the Ra surface roughness of the first, textured major face to the second, print receptive major face is in the range from about 3:2 to about 10:1.

17. The method of claim 1, wherein the ratio of the Ra surface roughness of the first, textured major face to the second, print receptive major face is in the range from about 3:2 to about 3:1.

18. A method of making a decorative laminate, comprising;
   a) providing a decorative film prepared according to the method of claim 1;
   b) directly or indirectly bonding the film to a substrate.

19. A method of making a decorative film, comprising the steps of:
   a) extruding a film having first and second major surfaces, wherein the film comprises polyvinyl chloride, wherein a pattern of protuberances is formed on the first major surface while the film is at least partially molten, wherein said protuberances have a plurality of different shapes and a plurality of different dimensions, wherein said plurality of different shapes comprise at least circular shaped protuberances, and wherein said protuberances are randomly arranged on the first major surface; and
   b) after forming said pattern on the first major surface, printing decorative information onto the second major surface of the film.

* * * * *